United States Patent
Dress et al.

(10) Patent No.: US 11,343,197 B2
(45) Date of Patent: May 24, 2022

(54) PACKET-FLOW MESSAGE-DISTRIBUTION SYSTEM

(71) Applicant: Lightfleet Corporation, Camas, WA (US)

(72) Inventors: William Dress, Camas, WA (US); Aaron LeClaire, Portland, OR (US)

(73) Assignee: Lightfleet Corporation, Camas, WA (US)

( * ) Notice: Subject to any disclaimer, the term of this patent is extended or adjusted under 35 U.S.C. 154(b) by 0 days.

(21) Appl. No.: 16/948,402

(22) Filed: Sep. 16, 2020

(65) Prior Publication Data

US 2020/0412661 A1 Dec. 31, 2020

Related U.S. Application Data

(63) Continuation-in-part of application No. 16/947,331, filed on Jul. 28, 2020, now Pat. No. 11,184,290, which is a continuation-in-part of application No. 16/799,774, filed on Feb. 24, 2020, now Pat. No. 11,228,458, application No. 16/948,402, which is a continuation-in-part of application No. 16/447,844, filed on Jun. 20, 2019, now abandoned, which is a continuation-in-part of application No. PCT/US2019/031052, filed on May 7, 2019, and a continuation of application No. 15/997,573, filed on Jun. 4, 2018, now abandoned, application No. 16/948,402, which is a continuation-in-part of application No. 15/262,402, filed on Sep. 12, 2016, now abandoned, which is a continuation-in-part of application No. 15/263,391, filed on Sep. 12, 2016, now abandoned, and a continuation-in-part of application No. 15/175,685, filed on Jun. 7, 2016, (Continued)

(51) Int. Cl.
*H04L 12/44* (2006.01)
*H04L 12/863* (2013.01)
*H04L 47/50* (2022.01)

(52) U.S. Cl.
CPC .............. *H04L 47/50* (2013.01); *H04L 12/44* (2013.01)

(58) Field of Classification Search
None
See application file for complete search history.

(56) References Cited

U.S. PATENT DOCUMENTS

2004/0068625 A1* 4/2004 Tseng .................. G06F 13/4004
　　　　　　　　　　　　　　　　　　　711/151
2006/0039374 A1* 2/2006 Belz ........................ H04L 47/10
　　　　　　　　　　　　　　　　　　　370/389

(Continued)

*Primary Examiner* — Gregory B Sefcheck
*Assistant Examiner* — Amarnauth G Persaud
(74) *Attorney, Agent, or Firm* — Schultz & Associates, P.C.

(57) ABSTRACT

Switchless interconnect fabric message distribution includes end-to-end partitioning of message pathways or multiple priority levels with interrupt capability. A switchless interconnect fabric message distribution system includes a data distribution module and at least two host-bus adapters connected to the data distribution module. The data distribution module includes partition first in first out buffers. Each of the host-bus adapters includes an input manager connected to input priority first in first out buffers and an output manager connected to priority first in first out buffers.

14 Claims, 4 Drawing Sheets

Related U.S. Application Data now abandoned, which is a continuation of application No. 15/175,685, filed on Jun. 7, 2016, now abandoned.

(60) Provisional application No. 62/687,785, filed on Jun. 20, 2018, provisional application No. 62/241,112, filed on Oct. 13, 2015, provisional application No. 62/217,001, filed on Sep. 10, 2015, provisional application No. 62/217,003, filed on Sep. 10, 2015, provisional application No. 62/217,004, filed on Sep. 10, 2015, provisional application No. 62/216,999, filed on Sep. 10, 2015.

(56) References Cited

U.S. PATENT DOCUMENTS

| | | | | |
|---|---|---|---|---|
| 2008/0008471 | A1* | 1/2008 | Dress | H01J 17/34 |
| | | | | 398/66 |
| 2014/0044430 | A1* | 2/2014 | Dress | H04B 10/801 |
| | | | | 398/66 |
| 2014/0133493 | A1* | 5/2014 | Miliavsky | H04L 45/44 |
| | | | | 370/406 |
| 2014/0314099 | A1* | 10/2014 | Dress | H04L 49/15 |
| | | | | 370/422 |
| 2016/0321012 | A1* | 11/2016 | Clark | G06F 3/061 |

\* cited by examiner

_US 11,343,197 B2_

PACKET-FLOW MESSAGE-DISTRIBUTION SYSTEM

CROSS-REFERENCE TO RELATED APPLICATIONS

This application is a continuation-in-part of U.S. application Ser. No. 16/947,331, filed on Jul. 28, 2020, which is a continuation-in-part of U.S. application Ser. No. 16/799, 774, filed on Feb. 24, 2020, which is a continuation-in-part of U.S. application Ser. No. 15/175,685, filed on Jun. 7, 2016, and is a continuation-in-part of U.S. application Ser. No. 15/262,391, filed Sep. 12, 2016 [now abandoned]. This application is a continuation-in-part of U.S. application Ser. No. 16/447,844, filed on Jun. 20, 2019, which claims priority benefit from U.S. Provisional Application No. 62/687,785, filed on Jun. 20, 2018, and is a continuation-in-part of PCT/US2019/031052, filed on May 7, 2019, and is a continuation of U.S. application Ser. No. 15/997,573, filed on Jun. 4, 2018 [now abandoned]. This application is a continuation-in-part of U.S. application Ser. No. 15/262, 402, filed on Sep. 12, 2016, which is a continuation of U.S. application Ser. No. 15/175,685, filed on Jun. 7, 2016, which claims priority benefit from U.S. Provisional Application No. 62/217,001, filed on Sep. 10, 2015, and U.S. Provisional Application No. 62/217,003, filed on Sep. 10, 2015, and U.S. Provisional Application No. 62/217,004, filed on Sep. 10, 2015, and U.S. Provisional Application No. 62/241,112, filed on Oct. 13, 2015, and U.S. Provisional Application No. 62/216,999, filed on Sep. 10, 2015. The patent applications identified above are incorporated here by reference in its entirety to provide continuity of disclosure.

BACKGROUND OF THE INVENTION

The invention relates generally to the field of multicomputer interconnects. An interconnect for a multicomputer system or cluster of cooperating hosts, servers, or other processing or storage elements is meant to connect separate and self-contained devices each with its own complement of control, local memory, and other resources. Such clusters are found in cloud storage and processing systems, enterprise computing, large database systems, as well as in high-performance computing.

A typical installation may include of a number of "tight" clusters which are interconnected by a single dedicated interconnect that may have auxiliary links to routers, the Internet, or directly to other interconnects. Multiple tight clusters may also be interconnected by a homogeneous fabric of like interconnects or by a heterogeneous hierarchy of interconnects of increasing complexity. The latter approach is fast giving way to the former which is based on regular topologies such as the Clos network or the high-dimensional hypercube network in homogeneous interconnect modules.

SUMMARY OF THE INVENTION

There is a need for the following embodiments of the present disclosure. Of course, the present disclosure is not limited to these embodiments.

According to an embodiment of the present disclosure, a method comprises: operating a message distribution system includes end-to-end partitioning of message pathways. According to another embodiment of the present disclosure, an apparatus comprises: a message distribution system including a data distribution module and at least two host-bus adapters coupled to the data distribution module, wherein the message distribution system includes end-to-end partitioning of message pathways. According to another embodiment of the present disclosure, a method comprises operating a message distribution system includes multiple priority levels with interrupt capability. According to another embodiment of the present disclosure, an apparatus comprises: a message distribution system including a data distribution module and at least two host-bus adapters coupled to the data distribution module, wherein the message distribution system includes multiple priority levels with interrupt capability.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION OF THE INVENTION

Figure 1:
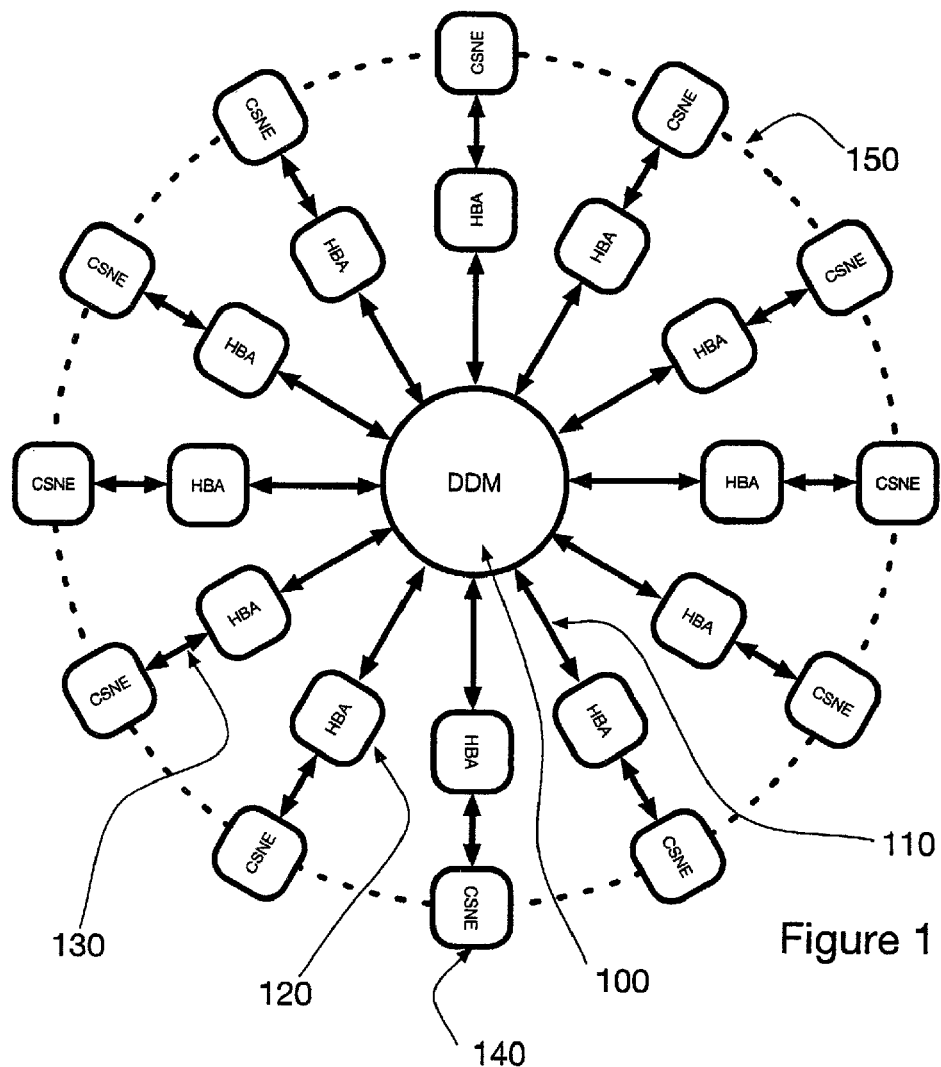
FIG. 1 illustrates a concept of a tightly coupled cluster of computing or storage or network elements.

Embodiments presented in the present disclosure and the various features and advantageous details thereof are explained more fully with reference to the nonlimiting embodiments that are illustrated in the accompanying drawings and detailed in the following description. Descriptions of well known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

The invention presented in this disclosure includes one or more data-distribution modules (DDMs) that mediate message transfers within a cluster or set of host processing stations via host-bus adapters (HBAs). The same internal protocol between host-bus adapters (HBAs) mediated by the DDM may be used to communicate between DDMs in a fabric version of the invention, allowing large numbers of hosts to be efficiently interconnected. The resulting message-distribution system (MDS) is a collection of interconnected HBAs and DDMs and the subject of this disclosure.

An earlier version of the DDM has been described in several issued patents and in several pending applications. The purpose of this disclosure is to present a system concept for which the previously disclosed DDM (variously termed DBOI (Direct Broadcast Optical Interconnect) or broadcast interconnect when based on U.S. Pat. Nos. 7,450,857; 7,630,648; 8,081,876; 7,970,279; 8,909,047 and 9,286,081 and/or WIPO Publication No. WO2013142742A1 plays an integral part. The entire contents of U.S. Pat. Nos. 7,450,857; 7,630,648; 8,081,876; 7,970,279; 8,909,047; and 9,286,081 and WIPO Publication No. WO2013142742A1 are all hereby expressly incorporated by reference herein for all purposes. Additional architectural and operational features (improvements) which cast a DDM in a system setting are described in this disclosure.

The main feature of the DDM is based on the concept of message or packet flow where a message or data packet is defined as one more data frames preceded by a start-of-message (SOM) frame and terminated by an end-of-message (EOM) frame. The SOM frame establishes paths within the DDM to the exit ports specified by a destination code contained therein (within the SOM frame). Once a path or paths are established, the rest of the message follows with the EOM releasing the path(s) in use.

The four main distinguishing features (improvements) present at the architectural or fundamental level of the design of this disclosure are that of the (1) fast-priority message (FPM), (2) the use of multiple priority levels, (3) "end-to-end" partitioning of the message pathways, and/or (4) support for cooperative working groups. The priority of a message is defined by the type of SOM introducing the message into the HBA. This priority is maintained through the DDM to the receiving HBA and. then to the receiving host. The basic FPM concept was presented in earlier disclosures, but the "end-to-end" priority channels (partitioning of the message pathways), multiple priority levels with a highest priority channel reserved specifically for FPMs and a channel reserved specifically for maintenance functions and support for cooperative working groups are particular improvements to the MDS design disclosed here. In a preferred embodiment, the management priority is just below the FPM priority to ensure that rarely used management messages get through in a timely fashion. In this embodiment, the packets or normal message traffic has a priority below the management priority.

All system traffic between components takes place on the same physical layer. That is, in a 48-way system, for example, where the DDM has 48 bidirectional connections to 48 different HBAs, all traffic, whether message traffic or control traffic (FPMs and maintenance messages) travels over these 48 input and 48 output wires (or cables, or fibers). The traffic type is distinguishable only by a type code and not by the particular connection it occupies. (The concept supports any number of inputs and outputs; n=48 in an n-way interconnect is used as an example in the preferred embodiment.)

Multiple priorities including three or more levels of priority allow flexibility by giving applications the ability to prioritize in more detail certain messages. One example would be to allow efficient and timely periodic memory updates for a group of set of groups by reserving the P1 priority channel for such updates.

Internally, the DDM is partitioned into one or more sections. Multiple partitions increase the probability of a message being delivered in case of a busy internal path or FIFO carrying a prior message to the same destination. The fundamental result of such partitions is to ensure that the DDM is strictly nonblocking in that a path to a free host whose HBA is not presently receiving a transmission may be connected to any host desiring to send to that free host. That is, the Partition FIFOs do not experience head-of-line blocking such as to prevent a free host from receiving messages. In the MDS, such nonblocking is accomplished without the use of virtual output queues, which are required in switches to ensure nonblocking operation.

Flow control is a "back pressure" from any host, HBA, or internal FIFO that is nearing capacity and is based on the FPM. A flow-control FPM (FCM) can be issued as an exception by any component along a message path and is sent directly to the DDM or HBA responsible for the exception, bypassing any message in transit so that it arrives in a timely fashion. It is preferred that such a bypass (interrupt) be graceful and not require at its completion the resending of a portion of the interrupted message in transit that has already been sent. Flow control conveys priority information allowing a higher priority to be transmitted even if a lower priority channel (from or to the same HBA) is halted.

A cooperative working group is a collection of tasks that are distributed among one or more hosts and coordinated by the MDS. A member of a group may only transmit messages to other group members although, in general, group membership can be shared. Many applications, however, require strict separation between groups both for security purposes and to reduce port contention wherein multiple sources require simultaneous access to the same exit port or HBA. The DDM contains a subscription table that is accessed by the group index and specifies to which ports a given message must gain access. The group concept and subscription table provide the low-level support for multicast.

An internal protocol, similar in structure to an Ethernet packet but with less overhead and greater overall flexibility and message security, is used for the paths HBA to DDM to HBA. Ethernet messages may, of course, be sent to and from the hosts for communicating with entities outside the cluster.

Those familiar with the art of digital signal transmission and manipulation will understand that there are other ways to effect the transmission from a host message, no matter how presented, to an HBA device that results in a serial data stream suitable for transmission on an optical fiber or other transmission structure to the distribution device, whether switch or DDM.

FIG. 1 illustrates the MDS as a collection of hosts, labeled CSNE 140 for computing, storage, or network element attached to host-bus adapters or HBAs 120 by data lines 130 such as PCI-express. The HBAs send one or more serial data streams via optical fibers 110 (in the preferred embodiment) to the data-distribution module DDM 100. Dashed line 150 represents any desired number of CSNE-HBA pairs connected to DDM 100.

Figure 2:
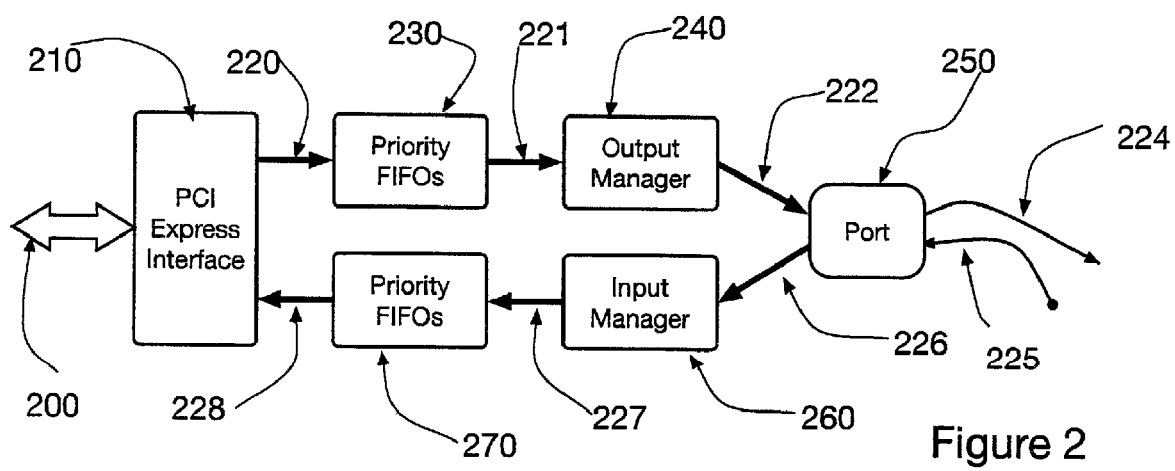
FIG. 2 depicts essentials of a HBA (host-bus adapter) needed to support a DDM (data distribution module).

Since CSNE 140 (computer, storage, or network element) can represent any of a number of device types, which is not of concern for this disclosure. HBA 120, however, must be compatible with the DDM and present data by a protocol that is understood and operated upon by DDM 100. FIG. 2 illustrates a compatible HBA, showing connection 200 from CSNE 140 and interface 210 including, in the preferred embodiment, a multiple-lane, high-speed PCI Express interface along with formatting process and buffer area to convert and order the PCI data streams into parallel lanes compatible with the transmission format chosen. In the preferred embodiment, the transmission of information between system elements, namely between HBA and DDM and, in the fabric version, between DDMs, takes place over high-speed serial links using the industry standard 64b66b or 64b67b Interlaken line code whereby a frame of 64 bits is encoded as a 66 or 67 bit serial data stream. The preprocessing of the message results in internal pathways in the HBA of 64 bits (in the preferred embodiment but not so limited by the invention to any particular path width) allowing a manageable internal clock rate much lower than the bit rate of the serial connection.

These 64-bit frames parsed from the input, along with destination and priority information from the host, are stored in priority FIFOs 230 via connections 220. There is one priority FIFO 230 for each priority where the number of priorities is a system-design parameter. In a preferred embodiment there are five levels (priorities) including a maintenance level and a highest fast priority message level. Output manager 240 has access to each FIFO along with the requested destination via connections 221. Output manager 240 prepares a SOM containing an identification (ID) of the destination group along with an offset into the destination host's memory so that the receiving HBA may store the entire received data by a direct memory access (DMA) action. The result of this operation is to prepare the message for a remote direct memory access (RDMA) from sender to receiver across the cluster. Output manager 240 additionally computes a 32-bit cyclic-redundancy check (CRC) using standard algorithms, and places the result in the EOM which is appended to the message as the final frame. The entire vector of frames is presented sequentially via connection 222 to bidirectional port 250 for conversion into an optical, serial data stream which is coupled to output fiber 224.

Output manager 240 operates according to the same prescription as the Output Manager in the DDM (see below for a comprehensive description). On the input side, a serialized optical signal is received at bidirectional port 250 via fiber connection 225 where it is converted to a parallel electrical bit stream and presented to input manager 260 via connections 226. Input manager 260 identifies the incoming data stream as to its priority and sends it to the appropriate priority FIFO 270 via connections 227. A mechanism is provided in input manager 260 that allows a higher-priority message to interrupt a lower-priority one by being queued into the FIFO of the correct priority. The priority code in the SOM is decoded to effect this switching, while an EOM switches back to loading the interrupted FIFO. Priority FIFOs 270 are sent to interface 210 via connections 228 as the message in a FIFO is completed by reception of the EOM. Interface 210 then formats the message and sends it to the host over connection 200. Input manager 260 operates according to the same prescription as the Input Manager in the DDM (see below for a comprehensive description).

Figure 3:
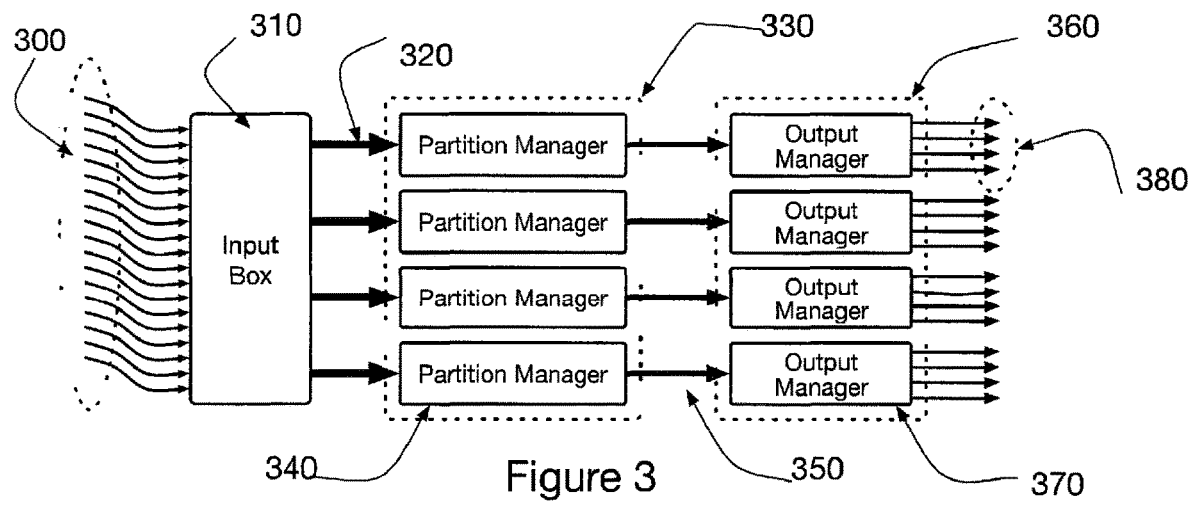
FIG. 3 shows the several components and their interconnections that define a data distribution module (DDM).

FIG. 3 illustrates the data flow to, through, and from the DDM. Output fiber 224 in the HBA are connected to the DDM's input stage, input box 310 via fiber connection 300. Input box 310 extracts and decodes the destination information from the SOM to select the partition(s) and priority channels for queuing the incoming message in middle box 330. The message is then sent along connections 320 to the chosen partition managers 340 in middle box 330, where it is either queued, if a delay is required, or it is immediately passed on to output manager 370 in output box 360 via connections 350. The partition concept extends from middle box 330 through output box 360. The priority structure is maintained throughout these partitions and priority interrupts, where a higher-priority message from an HBA can interrupt a lower-priority one by a simple path change made in input box 310, allowing the stream of incoming frames on a connection 300 to switch to the higher-priority queue within partition manager 340.

Partition manager 340 makes a connection to output manager 370 in the same partition when the SOM is cleared for transmission to output box 360. Output manager 370 then queues the message frames in a FIFO corresponding to the priority and exit port specified by the SOM's destination code. The message is then passed directly to the output port in output manager 370 where it is converted to a serial optical signal and sent along output fiber 380, or it is held in output manager 370 should the port be busy with another transmission.

In greater detail, suppose HBA j sends a message prefixed by a SOM containing the destination, priority, and an offset. This message will appear on input line 400 and enter the input box 310 on port 410 where it is converted to an electrical signal, deserialized, and sent to input processor channel 430 via parallel data lines 420. Input processor channel 430 extracts the destination and priority from the corresponding fields in the SOM. The destination is an index into a subscription table maintained in input box 310 by the aforementioned maintenance messages. Input processor channel 430 retrieves the exit code from the subscription table and decodes this information to obtain (1) the list of partitions that are to receive copies of the message and (2) the exit indices in the form of an exit map for each of the receiving partitions.

The exit map for each partition is sent to distributor 450 via connections 440 which contains a separate path for each of the partitions. Distributor 450 sends a copy of the SOM accompanied by the relevant exit map to the specified partition FIFO 470 via connections 460 and sets a mux in distributor 450 to connect the message channel to the indicated partition FIFO 470.

A consequence of the selection process effected by input processor channel 430 and implemented by distributor 450 is to send the incoming message frames from channel j onto connections 460 to be queued into the selected partition FIFOs 470 according to the exits decoded from the destination and priority fields carried by the SOM. Note that a SOM may specify a single priority and multiple partitions. All sub partitions k,p belonging to input index j indicated in FIG. 4 will receive a copy of the message so directed.

Connection 432 transfers any FCM frame transmitted by HBA j directly to output box 360, bypassing middle box 330 to maintain proper flow control from exit port j to prevent the input FIFO in input manager 260 from overflowing. Similarly, connection 434 transmits any response requested by a maintenance message received by the input stage from HBA j for queuing in a maintenance output FIFO (see below).

Figure 4:
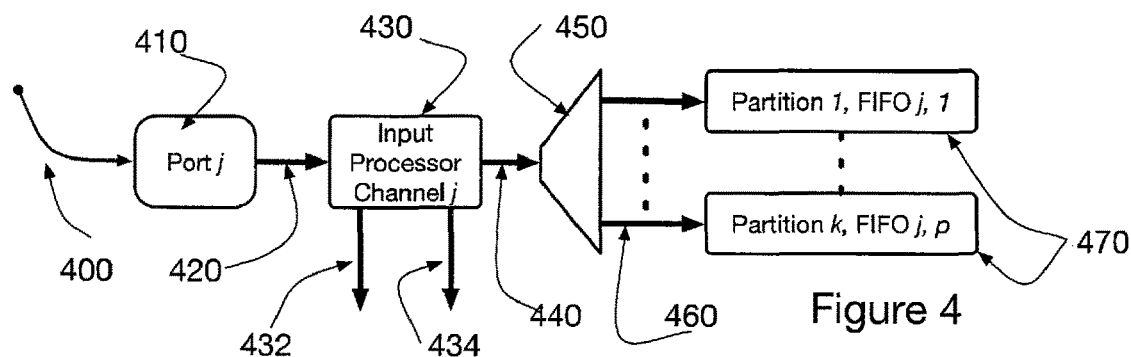
FIG. 4 lays out internals of the data distribution module's (DDM's) input stage.

Considering connections 320 in FIG. 3 together with connections 460 in FIG. 4 that are available to any input port, it becomes clear that a message on any connection 300 of FIG. 3 can be sent along a path to any of several partition FIFOs 470 that are specified by the destination and priority fields.

Figure 5:
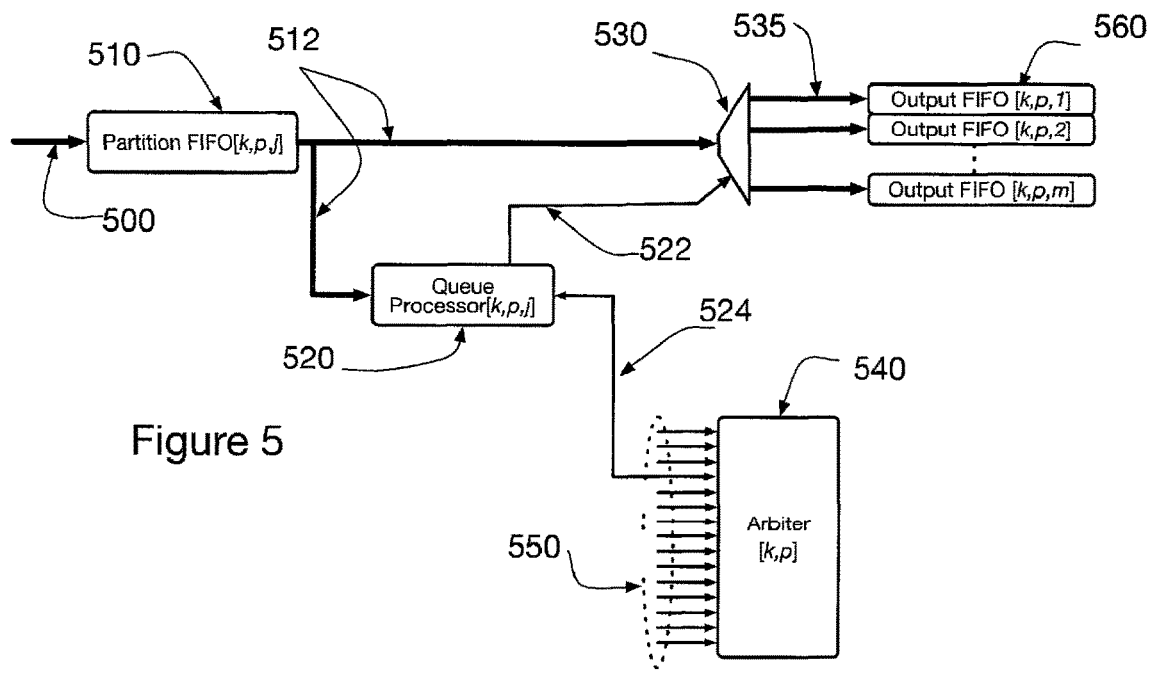
FIG. 5 illustrates the mechanism from the FIFOs (First In First Out buffers) in the interior of the data distribution module (DDM) to the output stage.

FIG. 5 illustrates the data flow from the middle box 330 to the output box 360 as shown in FIG. 3 and subsumed in partition manager 340. Partition FIFO 510, where k specifies the partition, p the priority, and j the input port, receives frames introduced by a SOM on input line 500 as determined by input processor channel 430. Each partition FIFO 510 has an associated queue processor 520 (indexed by the same {k,p,j} as the FIFO) that has access to the head or output frame residing in that FIFO via connection 512. Queue processor 520 may then determine if a frame is present or not, if the frame is a SOM or EOM, or simply a data frame.

When a SOM is identified as presenting a message with a set of exits {m} (for the sub partition k, p), this information is passed to corresponding arbiter 540 via connections 524. Dotted line 550 represents connections to and from the remaining Queue Processors [k, p, {j}] where {j} represents a collection of indices representing all input ports in the DDM.

Arbiter 540 compares the requested set of exits {m} with an internal exit map that maintains the state of mux 530 corresponding to the entire set of output FIFOs. If the bits in this map corresponding to the set {m} are not set, a release is granted by sending notification back to queue processor 520, which sets the state of mux 530 via lines 522 so that the SOM may be transferred to the set of output FIFOs 560 via the selected connections 535. The set of locations corresponding to {m} are then set in the map to prevent conflicting messages from being released into output FIFOs 560.

If the set {m} of locations in the bit map are not all clear, the request is not granted and the SOM must wait in partition FIFO 510 until such time that any conflicting messages have completed their transit from the middle box 330 to output box 360.

The state machine in each queue processor 520 periodically queries arbiter 540 as long as a SOM remains at the front of partition FIFO 510, ensuring that any pending message will be released as soon as the map bits {m} are clear.

Once the SOM has been released and transferred to the specified output FIFOs 560, the rest of the message follows by a handshake process controlled, for example, by read- and write-enable flags in the transmitting and receiving FIFOs. These flags reflect the current state of their respective FIFOs in the preferred embodiment, with the read enable set when there is a frame present in partition FIFO 510 and the write-enable set in one of output FIFOs 560 as long as there is room in that FIFO for the next frame to be transferred. Note that all output FIFOs 560 in the released set {m} must be write enabled for transfer to take place.

The transfer continues, frame-by-frame, until an EOM is transmitted. This event, detected by queue processor 520, clears the bits {m} in the exit-port map in arbiter 540, thus allowing any following message access to those output FIFOs 560 that received the EOM.

Figure 6:
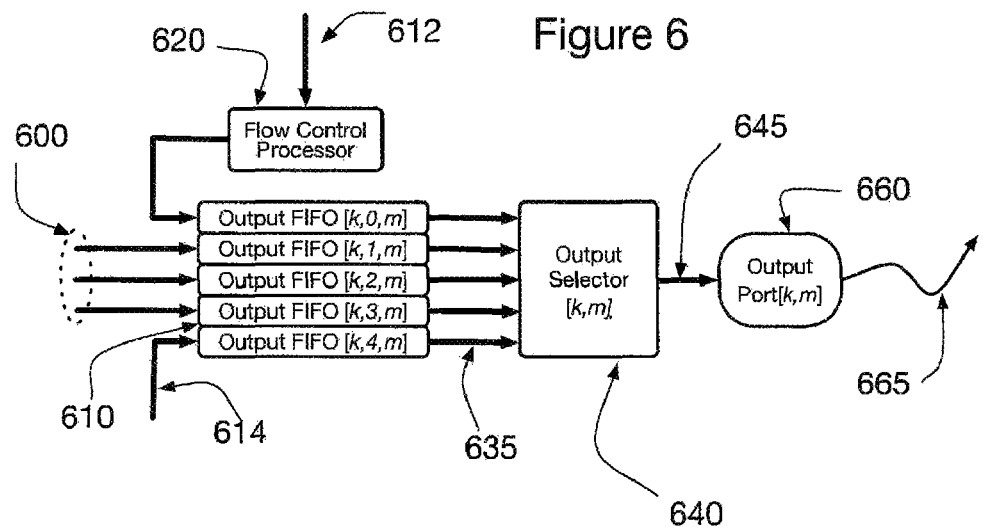
FIG. 6 depicts an output process that allows priority interrupts.

FIG. 6 illustrates the role of the output manager 370 in output box 360 as a process managing message traffic from all output FIFOs 560 to output port 660 in partition k for the specified output m in that partition. {p} is the set of message priorities supported by the MDS. This manager for partition k serves only exit m by mediating the traffic from all priorities from 0 to P+1, where P is the number of message priorities supported by the MDS. There is one such manager for each of the n output ports in the MDS. FIG. 6 depicts the preferred embodiment with P=3, resulting in a total of 5 output FIFOs 610 in each of the K partitions.

Inputs 600 from the set of MiddleBox Partition Managers as shown in FIG. 5 send message frames to output FIFOs 610 from each message priority as mediated by arbiter 540 in partition k for any or all of the P priorities. Input 614 allows any maintenance message prepared by input processor channel 430 on input channel j to be queued in Output FIFO [k, 4, m] via connection 434 where m=j mod M so the response is sent to the requesting HBA j. Likewise, input 612 contains information regarding any of the partition FIFOs 470 that generate a flow control exception. Input 612 also transmits any FCM sent by an HBA and processed in input processor channel 430 via connection 432. Both of these notifications are processed by the flow control processor 620 which either formats an FCM for delivery to HBAj in the case of a notification from partition FIFO 470 or controls the flow of frames to the output port [k, m] in the case of a notification from the input processor channel [j].

If one or more of the output FIFOs [k, {p}, m] contain at least one frame, output selector 640 selects, via connection 635, one of output FIFOs 610, depending upon priority, for transmission to output port 660 via connection 645. Output port 660 then serializes the frame of 64 bits (in the preferred embodiment), converts the electrical signal to a serial optical stream, and injects the bit stream onto the optical fiber 665 leading to HBA j. The details of this conversion and transmission process are well known to practitioners of the art of serial digital data transmission via optical fibers.

Internal Protocol

Externally (messages flowing into or out of the system of hosts, HBAs, and DDMs) one of the common protocols, such as Ethernet, may be used. Internally, messages are wrapped in the SOM and EOM for efficient and reliable transfer between hosts. In normal operation, the host sends a data packet in the form of destination, priority, message length and a sequence of bytes containing the message payload to its HBA. The payload contains arbitrary information and may include other communication protocols for routing outside the MDS. The function of the HBA is to decompose these data into frames (of 64 bits in the preferred embodiment), prefix the sequence of frames with the SOM control frame which contains information as to the packet's destination, priority, and offset into the receiving host's memory for the RDMA function. The HBA also prepares and appends the EOM control frame which contains a 32-bit CRC error-detecting code and a source designation identifying the transmitting HBA.

Figure 7:
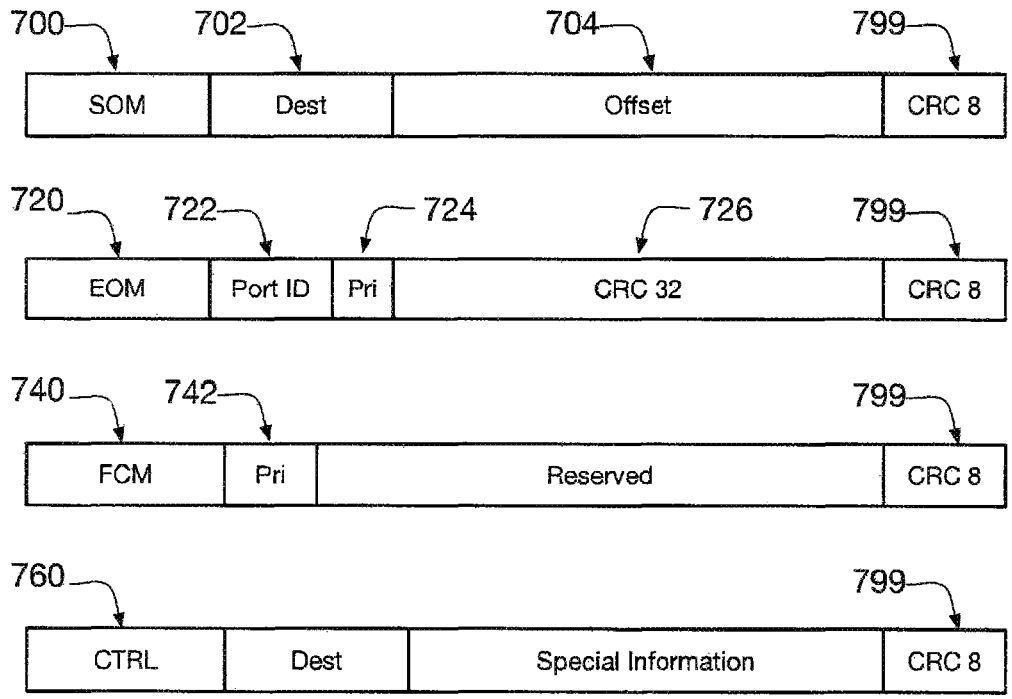
FIG. 7 defines the control-frame protocol fundamental to the operation and control of the distribution of messages.

FIG. 7 illustrates the MDS' transmission and control protocol in the preferred embodiment. Variations on this basic theme in keeping with the essential functions of group identification for multicast, DMA access into the destination memory, and reliability are, of course, possible. Each of these control frames is 64 bits long with the first section of the frame reserved for the control type (SOM frame-type identifier 700 in the case of the SOM header, EOM frame-type identifier 720 in the case of the EOM tail, FCM frame-type identifier 740 for FCMs, and CTRL frame-type identifier 760 for other types of control frames). These frame-type identifiers (700, 720, 740, and 760) are decoded in input box 310 and result in different actions in the input box 310 as discussed above. Each control frame has CRC 8 error code 799 occupying the final byte of the frame. This code may be used for error detection or error correction, depending on the algorithm used to compute the code; both operations are possible, but generally require different state machines in the HBAs and a different error-check in during the input-stage process.

The control-type identifier takes from 6 to 12 bits depending on the serial interface used to transmit and receive the information. In the preferred embodiment, these identifiers require 4 bits allowing for 16 different control types. The prefix bits 66:64 in the 64b66b encoding identify any frame as to a control or a data frame (or an error) according to the standard protocol for this encoding. Dest field 702 contains a group identifier of 12 bits in the preferred embodiment, allowing a full 2048 groups to be identified in the DDM (whose subscription table, in this case, would contain 2048 entries). Offset field 704 contains an offset into the memory of the destination offset from a base address, which specifies the start of the memory reserved to the specific group receiving the message.

The EOM is constructed in the same manner with EOM frame-type identifier 720 including of 4 bits in the preferred embodiment. The field port ID 722 contains a numerical identification of the HBA sending the message. This identification may be used in the receiving HBA or host to prepare an acknowledgement (ACK) or negative acknowledgement (NAK) to demand a resend should the MDS operate under a specific error-recovery protocol. The EOM frame also optionally contains priority field 724 that may be used for a variety of security and recovery purposes (not discussed in this disclosure). The main function of the EOM frame is to convey CRC 32 field 726 so that the integrity of the data frames lying between the SOM and EOM may be verified. This check is made in the receiving HBA, where, in case of an error, the entire message may be dropped or reported to the host so that a recovery or retransmission-request process may be initiated.

Each CRC 8 error code 799 contains a check sum or error-correcting code as describe above to protect the integrity of the first 56 bits of the control frame. In this way, essential control frames, such as FCMs for flow control, may be acknowledged via an ACK control frame (CTRL frame-type identifier 760). CRC 8 error code 799 for the SOM frame causes the frame and entire message to be dropped in case of an error. This prevents a catastrophic system error where the wrong host could have its memory overwritten or the wrong memory location in a valid host could be overwritten. Since CRC 8 error code 799 is checked in input processor channel 430, the transmitting HBA may be notified immediately by an error FPM control code (CRC 8 error code 799) passed directly to the correct output FIFO 610. In this case, the transmitting host would have the option to resend the message. If an error in the SOM is detected in the receiving HBA, the receiving host would have the option to request a resend by extracting the identification of the sending host from the EOM.

The FCM control frame contains priority field 742 that contains a bit map of the combined state of the partition FIFOs [k, p, j] receiving information from HBA j. This allows HBA j to either halt or restart a transmission from any of priority FIFOs 230.

An error detected on CRC 8 error code 799 in an EOM transmission to the DDM would initiate much the same action as described in the previous paragraph. An EOM error detected in the receiving EOM may require a more general type of error recovery. However, if CRC 8 error code 799 is an ECC (error-correcting code) such as Hamming (63,57) code, most all errors in the control frames could be corrected without the need for error-recovery in the host. Of course, this depends on the random bit-error rate experienced by the physical transport layer (in the preferred embodiment, this rate is experimentally $10^{-16}$, meaning that the frequency of occurrence of an uncorrectable error in a control frame would be vanishingly small).

It is seen, by the above discussion, that the control frames presented in FIG. 7 allow a versatile and secure operation of the MDS. Data integrity is protected end-to-end, from transmitting HBA, through the DDM and over the fiber connections, to the receiving HBA. Multicast messages (see the discussion on groups below) are supported at both the internal protocol level and by the processes inherent in the DDM from input box 310, through middle box 330, to output box 360.

Groups and Message Destination

The above detailed description of the drawings explains the relationship between the message header and the self-routing process that is inherent in the SOM's various fields and the mechanism of message management illustrated in FIGS. 3, 4, 5, and 6. A destination for a message includes two parts: the group ID and the offset. The group ID, in the preferred embodiment, serves as an index into a table of group subscriptions, said table being located in input box 310 for efficient access to the process that directs any message to the correct partitions and destinations.

Groups are defined at the application level and their table entries are communicated to the DDM by maintenance messages generated by a group manager process in a particular host. Such messages are directed the DDM itself and are not passed through to other hosts.

Fast-Priority Messages

Fast priority messages, such as the FCMs, allow the MDS to respond quickly and efficiently to a variety of situations, from FIFO management to reporting component failures in a timely fashion. Such messages are quick to transmit since each includes a frame of 64 bits that is transmitted at wire speed to any location in the cluster. The brevity and speed of these control messages enables a rapid system response to changing conditions as well as supports a graceful degradation of the system when hosts or HBAs are lost.

Fabric topologies based on interconnecting identical DDMs are the subject of WIPO Publication No. WO2013142742A1. The full impact of the self-routing packet is not fully evident until a fabric of multiple interconnected MDS modules are deployed. At each step across a fabric, the SOM opens a path in the most direct and efficient manner available to it at the moment it enters a fabric module. Path segment availability information is continually updated throughout the fabric by the back-pressure concept based on the FCMs as discussed above.

The advantage is that a global view of the state of message traffic is not required; indeed, a global supervisory control function based on such global knowledge, with its attendant reliance on specialized spanning-tree algorithms, is known to be unreliable and certainly adds to latency across the fabric. These issues are simply not present in a DDM fabric where each SOM effects path decisions as the message traverses the fabric.

Figure 8:
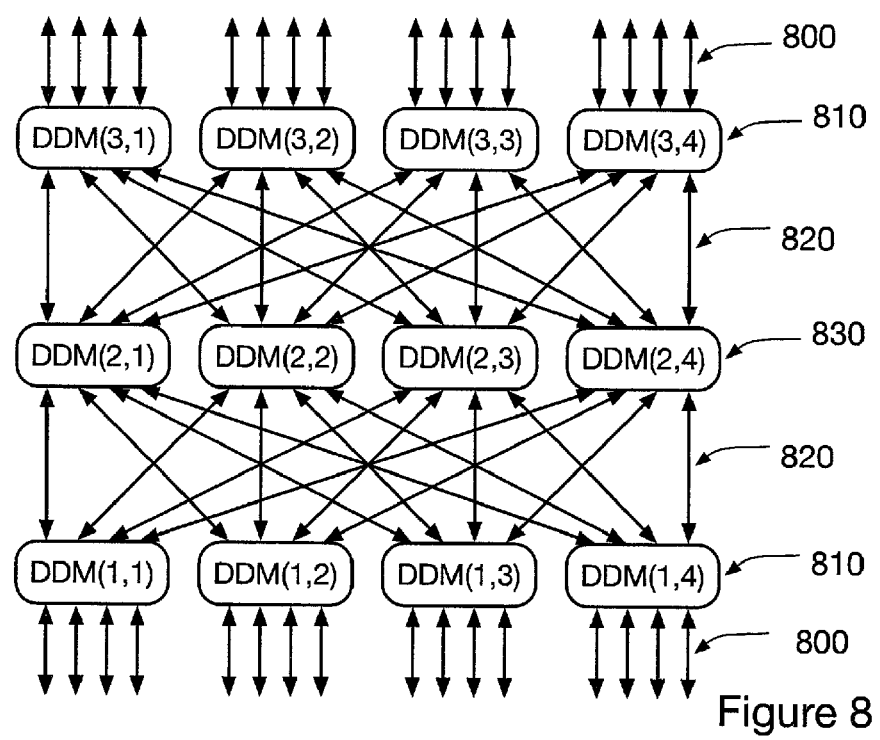
FIG. 8 gives an example of a type of fabric of data distribution modules (DDMs).

A DDM fabric includes multiple identical DDMs interconnected according in a specific topological arrangement such as a Clos or hypercube topology, to give two examples. An example of the Clos topology is shown in FIG. 8 which includes three layers of DDMs each with 8 bidirectional ports, is labeled by its position in the two-dimensional array with the first index referring to the row and the second to the column position in the array. Connections 800 are to the HBAs in the top and bottom rows while connections 820 are between row 1 and row 2 HBAs as well as between row 2 and row 3 HBAs such that each HBA in a row is connected to every HBA in an adjacent row. Rows 810 comprise the outer rows while row 830 is the inner row. A Clos fabric based on modules with n ports contains 3/2 n fabric modules (interconnects), $2(n/2)^2$ connections to HBAs, and $n^2/2$ interior connections between rows. The maximum number of hops to reach any HBA from any other, also known as the fabric diameter, is 3 for the Clos network. This topology is significantly more efficient in number of hops and hardware required than a tree structure interconnecting the same number of HBAs.

For such a fabric to support the inherent advantages of the self-routing messages described above, the subscription tables for multicast routing must be tailored to the specific topology. In the case of the Clos network of FIG. 8, each DDM requires a subscription table based on its location (or index pair) within the fabric so that the destination carried by an entering SOM is mapped to the correct output ports. The details depend on the assignment of HBA indices as well. The computation of these tables is based on a simple algorithm and the tables may be updated, with group membership changing as the application demands. Each subscription table is maintained by the process described above for maintenance messages.

Embodiments of this disclosure can include the use of a simple subscription table containing an exit map for each defined group. In embodiments of this disclosure, traffic flow through a fabric of identical DDMs depends the contents of the subscription table in each DDM.

Embodiments of this disclosure can include the fast-priority message that uses the same data links between MDS components as other messages. Most interconnect systems are based on Ethernet or Infiniband that both require much longer control messages than the fast-priority message 64 bits and/or are made over separate physical connections. Agile flow control based on the fast-priority message does not require additional connections or access to a control plane or supervisory traffic manager.

Definitions

The phrase end-to-end partitioning of message pathways is intended to mean partitioning of the message pathways from a CSME (computing, storage, or network element) to another CSME, for instance a priority channel from a computing element through a host-bus adapter through a data distribution module through another data distribution module then through another host-bus adapter and then to a storage element. The phrase multiple priority levels is intended to mean three or more priority levels, for instance five priority levels including a highest priority channel reserved specifically for fast priority messages and a channel reserved specifically for maintenance functions. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term uniformly is intended to mean unvarying or deviate very little from a given and/or expected value (e.g, within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present).

The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result.

The term step, when followed by the term "for" is intended to mean a (sub)method, (sub)process and/or (sub) routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

The invention claimed is:

1. A method comprising
operating a switchless interconnect fabric message distribution system including end-to-end partitioning of message pathways defining a priority channel between a data distribution module and at least two host-bus adapters coupled to the data distribution module wherein the priority channel is reserved for a plurality of fast-priority messages;
providing the data distribution module with a plurality of partition first in first out buffers;
providing each of the host-bus adapters with an input manager coupled to a plurality of input priority first in first out buffers and, an output manager coupled to a plurality of output priority first in first out buffers;
coupling the priority channel to the input manager and the plurality of output priority first in first out buffers, but not the plurality of input priority first in first out buffers;
converting a serialized optical signal to a parallel electrical bit stream within one of the at least two host bus adapters; and,
presenting the parallel electrical bit stream to the input manager and sending the parallel electrical bit stream to the plurality of input priority first in first out buffers.

2. The method of claim 1 further comprising:
providing at least three priority levels with interrupt capability.

3. The method of claim 1 further comprising:
providing support for cooperative working groups.

4. The method of claim 1 further comprising:
sub-partitioning of a set of message pathways.

5. An apparatus comprising:
a switchless interconnect fabric message distribution system including a first data distribution module and at least two host-bus adapters coupled to the first data distribution module, wherein the first data distribution module includes a plurality of partition first in first out buffers;
wherein each of the host-bus adapters includes an input manager coupled to a plurality of input priority first in first out buffers and an output manager coupled to a plurality of output priority first in first out buffers;
wherein the message distribution system includes end-to-end partitioning of message pathways defining a priority channel;
wherein the priority channel is reserved for a plurality of fast-priority messages;
wherein the priority channel is coupled to the input manager and the plurality of output priority first in first out buffers, but not coupled to the plurality of input priority first in first out buffers;
wherein a serialized optical signal is converted to a parallel electrical bit stream within one of the at least two host bus adapters;
wherein the parallel electrical bit stream is presented to the input manager; and,
wherein the parallel electrical bit stream is sent to the plurality of input priority first in first out buffers.

6. The apparatus of claim 5 further comprising:
a computing, storage or networking element coupled to each of the at least two host-bus adapters.

7. The apparatus of claim 5 further comprising:
a second data distribution module coupled to the first data distribution module.

8. A method comprising:
operating a switchless interconnect fabric message distribution system including i) end-to-end partitioning of message pathways defining a priority channel reserved for a plurality of fast-priority messages and ii) multiple priority levels with interrupt capability between a data distribution module and at least two host-bus adapters coupled to the data distribution module;
providing the data distribution module with a plurality of partition first in first out buffers;
providing each of the host-bus adapters with an input manager coupled to a plurality of input priority first in first out buffers and an output manager coupled to a plurality of output priority first in first out buffers;
coupling the priority channel to the input manager and the plurality of output priority first in first out buffers, but not the plurality of input priority first in first out buffers;
converting a serialized optical signal to a parallel electrical bit stream within one of the at least two host bus adapters; and,
presenting the parallel electrical bit stream to the input manager and sending the parallel electrical bit stream to the plurality of input priority first in first out buffers.

9. The method of claim 8 further comprising:
providing support for cooperative working groups.

10. The method of claim 8 further comprising:
providing the message distribution system with at least three priority levels with interrupt capability.

11. The method of claim 8 further comprising:
providing the message distribution system with sub-partitioning of message pathways.

12. An apparatus comprising:
a switchless interconnect fabric message distribution system including a first data distribution module and at least two host-bus adapters coupled to the first data distribution module, wherein the first data distribution module includes a plurality of partition first in first out buffers;
wherein each of the host-bus adapters includes an input manager coupled to a plurality of input priority first in first out buffers and an output manager coupled to a plurality of output priority first in first out buffers;
wherein the message distribution system includes i) end-to-end partitioning of message pathways defining a priority channel reserved for a plurality of fast-priority messages, wherein the priority channel is coupled to the input manager and the plurality of output priority first in first out buffers, but not coupled to the plurality of input priority first in first out buffers and ii) multiple priority levels with interrupt capability;

wherein a serialized optical signal is converted to a parallel electrical bit stream within one of the at least two host bus adapters;

wherein the parallel electrical bit stream is presented to the input manager; and, wherein the parallel electrical bit stream is sent to the plurality of input priority first in first out buffers.

13. The apparatus of claim 12 further comprising:

a computing, storage or networking element coupled to each of the at least two host-bus adapters.

14. The apparatus of claim 12 further comprising:

a second data distribution module coupled to the data distribution module.

* * * * *